United States Patent
Li

(10) Patent No.: US 10,680,974 B2
(45) Date of Patent: Jun. 9, 2020

(54) METHOD AND DEVICE FOR MONITORING DATA PROCESSING STATUS

(71) Applicant: ZTE CORPORATION, Shenzhen (CN)

(72) Inventor: Xiwen Li, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 97 days.

(21) Appl. No.: 15/762,789

(22) PCT Filed: Feb. 23, 2016

(86) PCT No.: PCT/CN2016/074367
§ 371 (c)(1),
(2) Date: Mar. 23, 2018

(87) PCT Pub. No.: WO2017/049861
PCT Pub. Date: Mar. 30, 2017

(65) Prior Publication Data
US 2018/0302339 A1     Oct. 18, 2018

(30) Foreign Application Priority Data
Sep. 25, 2015   (CN) .......................... 2015 1 0624732

(51) Int. Cl.
*G06F 15/173* (2006.01)
*H04L 12/911* (2013.01)
*H04L 12/26* (2006.01)
*H04L 12/927* (2013.01)
(Continued)

(52) U.S. Cl.
CPC ............ *H04L 47/822* (2013.01); *H04L 43/00* (2013.01); *H04L 43/08* (2013.01); *H04L 47/801* (2013.01); *H04L 29/08* (2013.01); *H04L 41/00* (2013.01)

(58) Field of Classification Search
CPC ......... H04L 29/08; H04L 41/00; H04L 43/00; H04L 43/08; H04L 47/801; H04L 47/822
See application file for complete search history.

(56) References Cited

U.S. PATENT DOCUMENTS

| | | | |
|---|---|---|---|
| 9,798,830 B2 * | 10/2017 | Imaki | ................. G06F 16/24568 |
| 2014/0304545 A1 | 10/2014 | Chen et al. | |
| 2016/0306668 A1 * | 10/2016 | Heil | ....................... G06F 9/5027 |

FOREIGN PATENT DOCUMENTS

| | | |
|---|---|---|
| CN | 103346901 A | 10/2013 |
| CN | 104281627 A | 1/2015 |

OTHER PUBLICATIONS

Jielong Xu, "T-Storm: Traffic-aware Online Scheduling in Storm", IEEE, 2014 (Year: 2014).*

(Continued)

*Primary Examiner* — Ryan J Jakovac

(57) ABSTRACT

Disclosed are one or more embodiments for monitoring data processing status. An example method includes at least the following steps: receiving processing information fed back by a working node of a last layer, wherein the processing information is fed back when the working node of the last layer completes processing of sub-data, and the sub-data is obtained by processing source data according to preset layers and decomposing the source data by a worker node; updating the processing status of the source data according to the processing information.

15 Claims, 3 Drawing Sheets

(51) Int. Cl.
*H04L 12/24* (2006.01)
*H04L 29/08* (2006.01)

(56) References Cited

OTHER PUBLICATIONS

Dena Dragos et al; "A managed distributed processing pipeline with Storm and Mesos"; 2013 Roedunet International Conference 12th Edition: Networking in Education and Reseach, IEEE; Sep. 26, 2013, pp. 1-6.
European Search Report for International Application No. 16847749. 5-1216/3352418 dated Jul. 26, 2018.
Liwei Lin et al.; "Pollux"; Extending Datebase Technology, ACM, 2 Penn Plaza, Suite 701, New York, NY, 10121 USA; Mar. 18, 2013; pp. 335-346.
Sainik Lavanya et al; "Fault tolerant date flow using curator-S"; 2013 IEEE 4th International Conference on Software Engineering and Service Science, IEEE; Jun. 27, 2014; pp. 472-475.

\* cited by examiner

METHOD AND DEVICE FOR MONITORING DATA PROCESSING STATUS

CROSS REFERENCE TO RELATED APPLICATION

This application is based on and claims priority to PCT Application No. PCT/CN2016/074367, filed on Feb. 23, 2016, which is based on and claims priority to Chinese Patent Application No. 201510624732.2, filed to Patent Office of the People's Republic of China on Sep. 25, 2015, and the entire contents thereof are incorporated herein by reference.

TECHNICAL FIELD

The present disclosure relates to the field of communications technologies, and in particular, to a method and device for monitoring data processing status.

BACKGROUND

STORM is a distributed, real-time computing system that can simply and reliably process streaming data. The STORM can be applied to real-time analysis, online machine learning, continuous computing, distributed remote procedure call protocol (RPC) calling, extract transform load (ETL, used for describing the procedure of extracting, transforming and loading data from the source to the destination end) and the like. The STORM has characteristics of scalability, error tolerance, high reliability of data processing, etc.

Each node will feed back a large amount of information to the management center during processing, which will occupy a large amount of network resources.

This section provides background information related to the present disclosure which is not necessarily prior art.

SUMMARY

By providing a method and device for monitoring data processing status, reducing network resources occupied by feedback information during processing is realized.

The present disclosure provides a method for monitoring data processing status, the method includes the following steps:

receiving processing information fed back by a working node of a last layer, wherein the processing information is fed back when the working node of the last layer completes processing of sub-data, and the sub-data is obtained by processing source data according to preset layers and decomposing the source data by a working node;

updating the processing status of the source data according to the processing information.

In addition, the present disclosure further provides a device for monitoring data processing status, the device including:

a receiving module configured to receive processing information fed back by a working node of a last layer, wherein the processing information is fed back when the working node of the last layer completes processing of sub-data, and the sub-data is obtained by processing source data according to preset layers and decomposing the source data by a working node;

an updating module configured to update the processing status of the source data according to the processing information.

In addition, the present disclosure further provides a device for monitoring data processing status, including:

a processor;

a memory for storing processor-executable instructions;

wherein, the processor is configured to:

receive processing information fed back by a working node of a last layer, wherein the processing information is fed back when the working node of the last layer completes processing of sub-data, and the sub-data is obtained by processing source data according to preset layers and decomposing the source data by a working node;

update the processing status of the source data according to the processing information.

In addition, the present disclosure further provides a non-transitory computer-readable storage medium having stored therein instructions that, when executed by a processor, cause the processor to implement a method for monitoring data processing status, the method including the steps of:

receiving processing information fed back by a working node of a last layer, wherein the processing information is fed back when the working node of the last layer completes processing of sub-data, and the sub-data is obtained by processing source data according to preset layers and decomposing the source data by a working node;

updating the processing status of the source data according to the processing information.

The present disclosure receives processing information fed back by a working node of a last layer, the processing information being fed back when the working node of the last layer completes processing of sub-data, and the sub-data being obtained by processing source data according to preset layers and decomposing the source data by a working node, and updates the processing status of the source data according to the processing information. In this way, in the present disclosure, feedback path information is sent only when the working node of the last layer that processes the source data completes the processing, without the need for feeding back the processing information whenever each node completes the processing, in order to reduce network resources occupied by feedback information during the processing, preventing a message blocking problem that may be caused by processing a large amount of feedback information, and being capable of improving the overall performance of the real-time computing system.

This section provides a summary of various implementations or examples of the technology described in the disclosure, and is not a comprehensive disclosure of the full scope or all features of the disclosed technology.

The implementations, the functional characteristics and the advantages of the present disclosure will be further described in combination with embodiments with reference to the accompanying drawings.

DETAILED DESCRIPTION

It should be understood that the specific embodiments described herein are merely used to explain the present disclosure, and are not intended to limit the present disclosure.

Currently the following scheme is generally used for processing data in the STROM:

When a data is created or processed in a STORM system, the system allocates a 64-bit random value to the data as a random ID. The random ID is used to track the process of creating the data, thereby generating a directed acyclic graph (tuple tree or tuple DAG) for the data.

For each data, the ID of the corresponding root data in the directed acyclic graph where it resides is known. When each node performs processing, it may generate a new corresponding data, and the ID of the corresponding root data in the directed acyclic graph is added into the data. Whenever a node finishes processing, the node will send a message to the management center to notify the management center that the processing of the data is completed, that is, after finishing processing a data, each node feeds back to the management center once and updates the status of the directed acyclic graph.

The present disclosure provides a method for monitoring data processing status.

Figure 1:
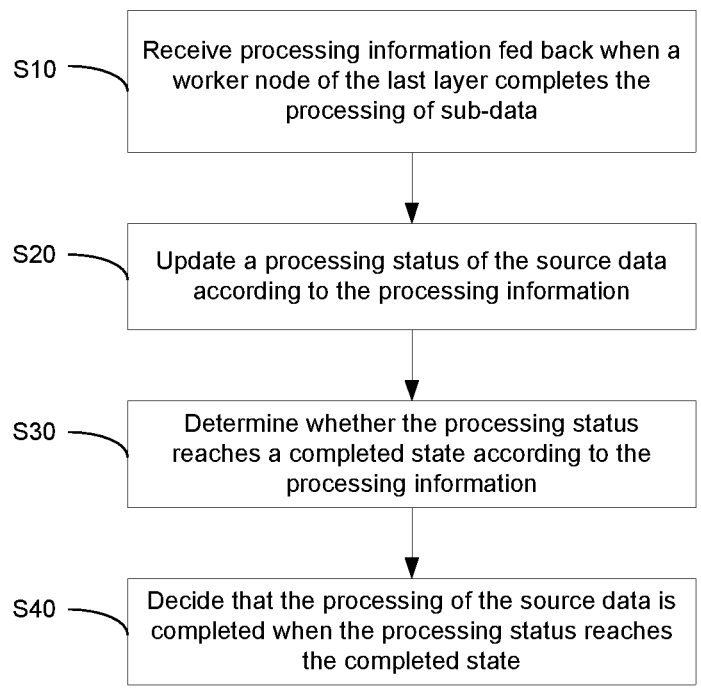
FIG. 1 is a schematic flow chart of a first embodiment of a method for monitoring data processing status of the present disclosure.

Referring to FIG. 1, a schematic flow chart of a first embodiment of a method for monitoring data processing status of the present disclosure is depicted.

In this embodiment, the method for monitoring data processing status includes the following steps.

In a step of S10, processing information fed back by a working node of a last layer is received, wherein the processing information is fed back when the working node of the last layer completes processing of sub-data.

The present disclosure can be applied to a distributed real-time computing system STORM, and certainly, those skilled in the art can apply the disclosure to other systems according to the idea of the present disclosure.

In the distributed real-time computing system STORM, the first layer includes a working node. The working node of the first layer is used to generate source data, and can read data from an external data source and transform the external source into internal source data, or a user generates source data at the working node of the first layer. After the source data is obtained, the source data is decomposed into at least one sub-data, and the at least one sub-data is randomly sent to subsequent layers according to preset layers for processing. The amount of data processed by each working node of each layer may be different. For example, the working node of the first layer decomposes the source data into three first sub-data and sends the three first sub-data to three working nodes in the second layer for processing. The three working nodes in the second layer each may further decompose the received first sub-data into at least one second sub-data and send the at least one second sub-data to the working nodes in the third layer for processing.

Figure 2:
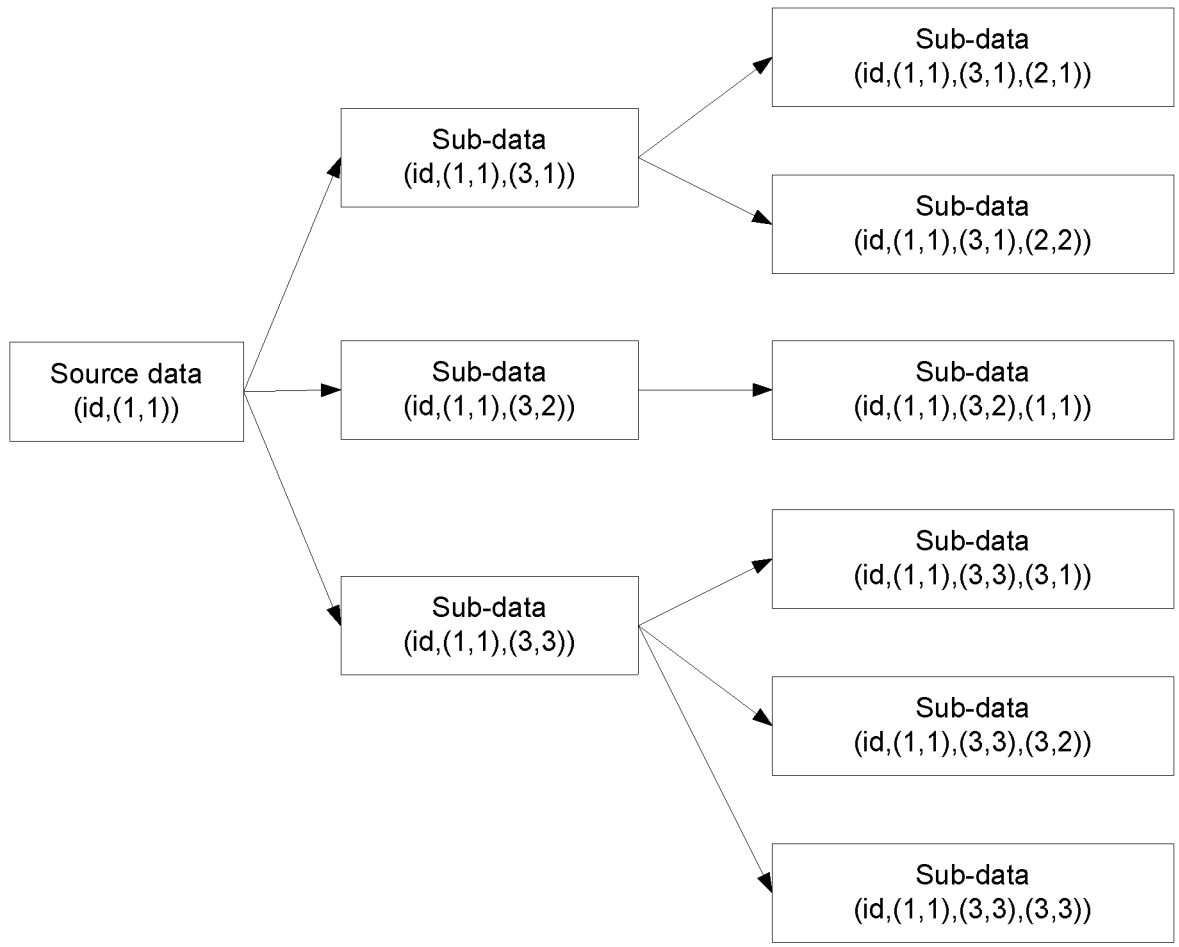
FIG. 2 is a schematic diagram of the generation of the ID of a working node in an embodiment of the present disclosure.

In this embodiment, when each node creates or processes data, the ID of the corresponding node can be added into the processed data. The ID is used to indicate the identifier of each node, and includes the amount of decomposition of the source data or sub-data (the amount of decomposition of the source data or sub-data means an amount of the sub-data generated in the working node of the current layer by decomposing the source data or the sub-data in the working node of an upper layer) and a corresponding serial number. The generation rule is as shown in FIG. 2: when a node of a first layer creates data, a corresponding ID (1, 1) is added into the source data, and then the data is delivered according to preset layers; if the first layer decomposes the source data into three sub-data and sends the three sub-data respectively to the working nodes in the second layer, then the generated IDs corresponding to the sub-data processed by the working nodes in the second layer are ((1,1), (3,1)), ((1,1), (3,2)), ((1,1), (3,3)); thereafter if the working nodes in the second layer each decompose the obtained three sub-data into two corresponding sub-data respectively, the amount of sub-data to be processed by the working nodes in the third layer is five; when the sub-data with the ID of ((1,1), (3,1)) is transmitted, after being processed, to a certain working node of the third layer, and is decomposed into two sub-data, then the correspondingly added IDs may be ((1, 1), (3,1), (2,1)) and ((1,1), (3, 1) (2, 2)); when the sub-data with the ID of ((1,1), (3,2)) is transmitted, after being processed, to a certain node of the third layer, and is not decomposed, then the correspondingly added ID may be ((1,1), (3,2), (1,1)); when the sub-data with the ID of ((1,1), (3,3)) is transmitted, after being processed, to a certain node of the third layer, and is decomposed into three sub-data, then the correspondingly added IDs may be ((1, 1), (3, 3), (3, 1)), ((1, 1), (3, 3), (3,2)) and ((1,1), (3,3), (3,3)). That is, the IDs added into the generated sub-data in this embodiment also include the IDs of the previous source data. The path information fed back by the working node of the last layer to the management center when the processing is completed may be the working node's own ID. Other ID generation rules may also be set. For example, as each working node only knows the decomposed amount of sub-data that is processed by itself, the decomposed amount of the sub-data being obtained by decomposing the sub-data by the working node of an upper layer, taking the topology of working nodes in FIG. 2 as an example, the ID added into the data in the working node of the first layer is the same as abovementioned, (1, 1); the working nodes of the second layer record that the working node of the first layer decomposes the data into three sub-data, and the IDs added into the processed data can be (3,1), (3,2) and (3,3) and are marked as a second layer, and so on. After the processing is completed, the processing information, fed back by the working nodes of the last layer, includes the amounts of decomposition of sub-data at each layer and the corresponding serial numbers.

The working node of the first layer generates source data, and according to preset layers, sends the source data to the working nodes in subsequent layers layer by layer, and the working nodes of subsequent layers perform corresponding processing according to the source data, including but not limited to filtering, function operations, combination, write the database and other operations. For example, the working node of the first layer sends the source data to two working nodes in the second layer; the working nodes in the second layer both perform a corresponding filtering operation, decompose the data into six sub-data and randomly send the six sub-data to a plurality of working nodes in the third layer; the plurality of working nodes in the third layer perform corresponding function operations, and then write the data into the database.

When the working nodes of the last layer complete processing the corresponding sub-data, the processing information of processing sub-data by the working nodes is fed back to the management center or the server. In this embodiment, the IDs of the sub-data processed by the working nodes of the last layer are fed back. The management center or server receives the processing information and then proceeds to a step of S20.

In the step of S20, updating the processing status of the source data according to the processing information.

In this embodiment, the management center or the server may perform an analysis, according to the IDs of the processed sub-data fed back by the working nodes in the processing in the step of S10, on the basis of the ID generation rule, and may know the layers through which the sub-data have passed, the amount of sub-data decompositions in each layer and the corresponding serial numbers in each layer, so as to know the processing status of the source data. If the IDs of the processed sub-data are not received, such as a transfer relationship, then on the basis of the amount of corresponding sub-data decompositions by the working nodes of each layer and the corresponding serial numbers, the management center or the server may know the processing status of the source data, according to the transfer information fed back.

In this embodiment, when the processing information fed back by the working nodes of the last layer is received for the first time, a new directed acyclic graph corresponding to the source data may be created, that is, a processing status tree. Alternatively, the directed acyclic graph corresponding to the source data may not be created. For example, when a working node generates the source data, a corresponding status tree is generated and sent to the management center or the server. During the processing, each time the processing information is obtained, the processing status tree is updated correspondingly.

In a step of S30, it is determined whether the processing status reaches a completed status according to the processing information.

According to the received processing information, it is determined whether the processing status reaches a completed status, the completed status is the status of a status tree corresponding to the to-be-processed data when the processing of the to-be-processed data is completed. In this embodiment, each time an ID fed back by a working node of the last layer is received, an analysis is performed according to the ID generation rule, and it is possible to know the serial number and layer of the sub-data corresponding to the received ID and the amount of sub-data decomposed by the previous layer, so as to determine whether the processing of the sub-data of the penultimate layer is completed. In this way, it is possible to know whether the processing status of the to-be-processed data reaches a completed status. For example, according to the ID: ((1,1), (3,3), (2,2)), it can be known that the to-be-processed data passes through three layers: the first layer decomposes the source data into three sub-data, the data numbered as 3 among the three sub-data is further decomposed into two sub-data, and upon receiving the ID including (1, 1), (3, 3), it is determined that the processing of the sub-data numbered as 3 in the second layer is completed, and similar determinations are made for other data.

In a step of S40, when the processing status reaches a completed status, it is determined that the source data processing is completed.

According to the determination result of the step of S30, when the processing status of the to-be-processed data reaches a completed status, it is determined that the source data processing is completed.

Further, when the source data processing is completed, the working node generating the source data is notified that the source data processing is completed. Optionally, when the source data processing is completed, the working node generating the source data may not be notified. For example, when it is determined that the source data processing fails, the working node generating the source data is notified with a message that the source data processing fails. If the working node generating the source data does not receive the information of the processing failure within a preset time, it is determined that the source data processing is completed.

If the management center or the server does not receive the processing information fed back by the working node of the last layer within the preset time, it is determined that the to-be-processed data processing fails. The present disclosure can start timing when the working node of the first layer generates to-be-processed data, and can also start timing when the processing information sent by the working node of the last layer is received for the first time.

The working node generating the source data may also be notified either when the source data processing succeeds or fails. In more implementations, the working node generating the source data may also be notified each time the status is updated.

The present disclosure receives processing information fed back when a working node of the last layer completes the processing of sub-data, wherein the sub-data is obtained by processing source data according to preset layers and decomposing the source data by a working node, and updates the processing status of the source data according to the processing information. In this way, in the present disclosure, feedback path information is sent only when the working node of the last layer that processes the source data completes the processing, without the need for feeding back the processing information whenever each node completes the processing, in order to reduce network resources occupied by feedback information during the processing, prevent a message blocking problem that may be caused by processing a large amount of feedback information, and be capable of improving the overall performance of the real-time computing system.

Figure 3:
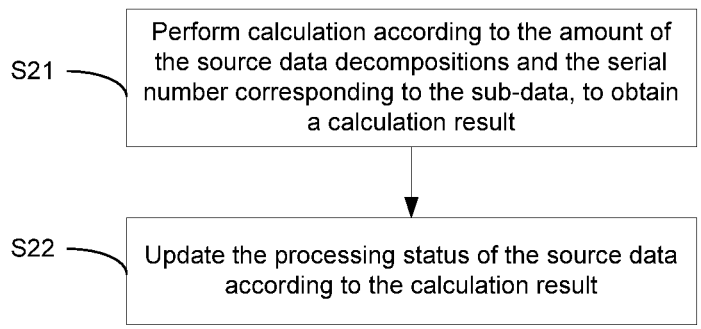
FIG. 3 is a schematic detailed flow chart of steps of updating the processing status of the source data according to the processing information in an embodiment of the present disclosure.

Referring to FIG. 3, a flowchart of updating the processing status of the source data according to the processing information in an embodiment of the present disclosure.

Based on the first embodiment of the method for monitoring data processing status of the present disclosure, a step of S20 may include the following step.

In a step of S21, calculation is performed to obtain a calculation result according to the amount of the source data decompositions and the corresponding serial number.

The management center or the server may perform calculation to obtain a calculation result, according to the path sent by the working nodes of the last layer. For example, according to the received ID: ((1,1), (3,2), (2,2)), the obtained path through which the corresponding source data passes is that in the first layer, the to-be-processed data is decomposed into three first sub-data and then sent to the working nodes in the second layer for processing, the first sub-data with a serial number of 2 is decomposed into two second sub-data and sent to the third layer for processing, and at this moment, the processing information of a second sub-data with a serial number of 2 is received. Then, proceed to a step of S22.

In the step of S22: the processing status of the source data is updated according to the calculation result.

According to the calculation result obtained in the step of S21, the processing status of the source data is updated, that is, the directed acyclic graph of the source data is updated.

The present disclosure further provides a device for monitoring data processing status.

Figure 4:
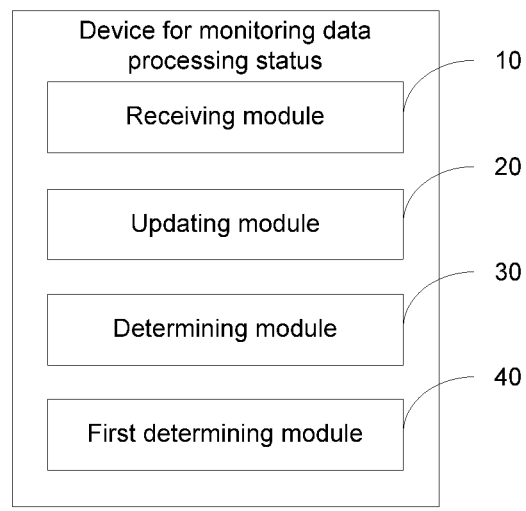
FIG. 4 is a schematic diagram of functional modules of a first embodiment of a method for monitoring data processing status of the present disclosure.

Referring to FIG. 4, a schematic diagram is shown of a first embodiment of a device for monitoring data processing status of the present disclosure.

In this embodiment, the device for monitoring data processing status includes:

A receiving module 10 configured to receive processing information fed back when a working node of the last layer completes the processing of sub-data, wherein the sub-data is obtained by processing source data according to preset layers and decomposing the source data by a working node.

The present disclosure is mainly applied to the distributed real-time computing system STORM, and certainly, those skilled in the art can apply the disclosure to other systems according to the idea of the present disclosure.

In the distributed real-time computing system STORM, the first layer includes a working node. The working node of the first layer is used to generate source data, and can read data from an external data source and transform the external data source into internal source data, or a user generates source data at the working node of the first layer. After the source data is obtained, the source data is decomposed into at least one sub-data, and is randomly sent to subsequent layers according to preset layers, layer by layer, for processing. The amount of data processed by each working node of each layer may be different. For example, the working node of the first layer decomposes the source data into three first sub-data and sends the three first sub-data to three working nodes in the second layer for processing. The three working nodes in the second layer each may further decompose the received first sub-data into at least one second sub-data and send the at least one second sub-data to the working nodes in the third layer for processing.

In this embodiment, when each node creates or processes data, the ID of the corresponding node can be added into the processed data. The ID is used to indicate the identifier of each node, and includes the amount of the source data decompositions and a corresponding serial number. The generation rule is as shown in FIG. 2: when a node of a first layer creates data, a corresponding ID (1, 1) is added into the source data, and then the data is delivered according to preset layers; if the first layer decomposes the source data into three sub-data and sends the three sub-data respectively to the working nodes in the second layer, then the generated IDs corresponding to the sub-data processed by the working nodes in the second layer are ((1,1), (3,1)), ((1,1), (3,2)), ((1,1), (3,3)); thereafter if the working nodes in the second layer each decompose the obtained three sub-data into two corresponding sub-data, the amount of sub-data to be processed by the working nodes in the third layer is five; when the sub-data with the ID of ((1,1), (3,1)) is transmitted, after being processed, to a certain working node of the third layer, and is decomposed into two sub-data, then the correspondingly added IDs are ((1, 1), (3,1), (2,1)) and ((1,1), (3, 1) (2, 2)) respectively; when the subdata with the ID of ((1,1), (3,2)) is transmitted, after being processed, to a certain node of the third layer, and is not decomposed, then the correspondingly added ID may be ((1,1), (3,2), (1,1)); when the sub-data with the ID of ((1,1), (3,3)) is transmitted, after being processed, to a certain node of the third layer, and is decomposed into three sub-data, then the correspondingly added IDs may be ((1, 1), (3, 3), (3, 1)), ((1, 1), (3, 3), (3,2)) and ((1,1), (3,3), (3,3)). That is, the IDs added into the generated sub-data in this embodiment also include the IDs of the previous source data. The path information fed back by the working node of the last layer to the management center when the processing is completed may be its own ID. Of course, other ID generation rules may also be set. For example, as each working node only knows the amount of sub-data that is processed by itself, the decomposed amount of the sub-data being obtained by decomposing the sub-data by the working node of an upper layer, taking the topology of working nodes in FIG. 2 as an example, the ID added into the data in the working node of the first layer is the same as abovementioned, (1, 1); the working nodes of the second layer record that the working node of the first layer decomposes the data into three sub-data, and the IDs added into the processed data can be (3,1), (3,2) and (3,3) and are marked as a second layer, and so on. The processing information fed back by the working node of the last layer after the processing is completed includes the amount of decomposition of sub-data at each layer and the corresponding serial numbers.

The working node of the first layer generates source data, and according to preset layers, sends the source data to the working nodes in subsequent layers, layer by layer, and the working nodes in subsequent layers perform corresponding processing according to the received source data, including but not limited to filtering, function operations, combination, write the database and other operations. For example, the working node of the first layer sends the source data to two working nodes in the second layer; the working nodes in the second layer both perform a corresponding filtering operation, decompose the data into six sub-data and randomly send the six sub-data to a plurality of working nodes in the third layer; the plurality of working nodes in the third layer perform corresponding function operations, and then write the data into the database.

When the working nodes of the last layer that process the corresponding sub-data complete the processing, the processing information of the working nodes processing sub-data is fed back to the management center or the server. In this embodiment, the IDs of the sub-data processed by the working nodes of the last layer are fed back.

An updating module 20 is configured to update the processing status of the source data according to the processing information.

In this embodiment, the management center or the server may perform an analysis, according to the IDs of the processed sub-data fed back by the working nodes in the processing in the step of S10, on the basis of the ID generation rule, and may know the layers through which the sub-data have passed, the amount of sub-data decompositions in each layer and the corresponding serial numbers, so as to know the processing status of the source data. If the IDs of the processed sub-data are not received, such as a transfer relationship, then on the basis of the amount of sub-data decompositions by the working nodes of each layer and the corresponding serial numbers, the management center or the server may know the processing status of the source data, according to the transfer information fed back.

In this embodiment, when the processing information fed back by the working nodes of the last layer is received for the first time, a new directed acyclic graph corresponding to the source data may be created, that is, a processing status tree. A directed acyclic graph corresponding to the source data may not be newly created. For example, when a working node generates the source data, a corresponding status tree is generated and sent to the management center or the server. During the processing, each time the processing information is obtained, the processing status tree is updated correspondingly.

A determining module 30 is configured to determine whether the processing status reaches a completed status according to the processing information.

According to the received processing information, it is determined whether the processing status reaches a completed status, the completed status being the status of a status tree corresponding to the to-be-processed data when the processing of the to-be-processed data is completed. In this embodiment, each time an ID fed back by a working node of the last layer is received, an analysis is performed according to the ID generation rule, and it is possible to know the serial number and layer of the sub-data corresponding to the received ID and the amount of sub-data decomposed at the previous layer, so as to determine whether the processing of the sub-data of the penultimate layer is completed. In this way, it is possible to know whether the processing status of the to-be-processed data reaches a completed status. For example, according to the ID: ((1,1), (3,3), (2,2)), it can be known that the to-be-processed data passes through three layers: the first layer decomposes the source data into three sub-data, the data numbered as 3 among the three sub-data is further decomposed into two sub-data, and upon receiving the ID including (1, 1), (3, 3), it is determined that the processing of the sub-data numbered as 3 in the second layer is completed, and similar determinations are made for other data.

A first determining module 40 is configured to determine that the source data processing is completed when the processing status reaches a completed status.

According to the determination result of the determining module 30, when the processing status of the to-be-processed data reaches a completed status, it is determined that the source data processing is completed.

Further, the device may include a second determining module (not shown) configured to determine that the processing of the source data fails when the processing information, sent by the working node of the last layer when completing the processing of the source data, is not received within a preset time.

If the management center or the server does not receive the processing information fed back by the working node of the last layer within the preset time, it is determined that the to-be-processed data processing fails. The present disclosure can start timing when the working node of the first layer generates to-be-processed data, and of course can also start timing when the processing information sent by the working node of the last layer is received for the first time.

Further, the device further includes a notification module (not shown) configured to notify the working node generating the source data when it is determined that the source data processing is completed or the processing fails.

When the source data processing is completed, the working node generating the source data is notified that the source data processing is completed. When the source data processing is completed, the working node generating the source data may not be notified. For example, when it is determined that the source data processing fails, the working node generating the source data is notified with a message that the source data processing fails. The working node generating the source data may also be notified either when the source data processing succeeds or fails. In more embodiments, the working node generating the source data may also be notified each time the status is updated.

The present disclosure receives processing information fed back when a working node of the last layer completes the processing of sub-data, wherein the sub-data is obtained by processing source data according to preset layers and decomposing the source data by a working node, and updates the processing status of the source data according to the processing information. In this way, in the present disclosure, feedback path information is sent only when the working node of the last layer that processes the source data completes the processing, without the need for feeding back the processing information whenever each node completes the processing, in order to reduce network resources occupied by feedback information during the processing, preventing a message blocking problem that may be caused by processing a large amount of feedback information, and being capable of improving the overall performance of the real-time computing system.

Figure 5:
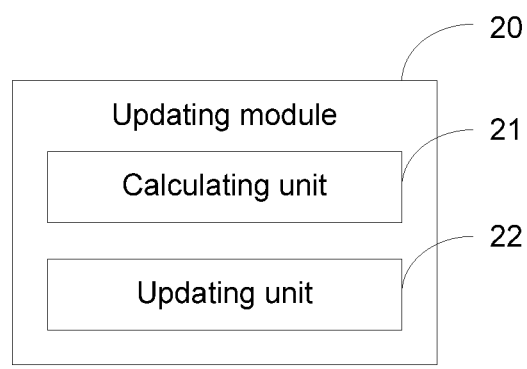
FIG. 5 is a schematic detailed functional module diagram of an updating module in an embodiment of the present disclosure.

FIG. 5 depicts a diagram of an updating module in an embodiment of the present embodiment.

Based on the first embodiment of the device for monitoring data processing status of the present disclosure, the updating module 20 may include:

A calculating unit 21 configured to perform calculation to obtain a calculation result according to the amount of the source data decompositions and the corresponding serial number.

The management center or the server may perform calculation to obtain a calculation result according to the received path sent by the working nodes of the last layer. For example, according to the received ID: ((1,1), (3,2), (2,2)), the obtained path through which the corresponding source data passes is that in the first layer, the to-be-processed data is decomposed into three first sub-data and then sent to the working nodes in the second layer for processing, the first sub-data with a serial number of 2 is decomposed into two second sub-data and sent to the third layer for processing, and at this moment, the processing information of a second sub-data with a serial number of 2 is received.

An updating unit 22 is configured to update the processing status of the source data according to the calculation result.

According to the calculation result obtained by the updating unit 22, the processing status of the source data is updated, that is, the directed acyclic graph of the source data is updated.

The foregoing is a description of only a few embodiments of the technical solutions provided in the present disclosure, and is not intended to limit the scope of the technical solutions. Any equivalent structures or equivalent process changes made using the description of the present disclosure and the accompanying drawings, or directly or indirectly used in other related technical fields, are equally included in the scope of patent protection of the present disclosure.

INDUSTRIAL PRACTICABILITY

The method and device for monitoring data processing status of the present application can be applied to a real-time computing system such as STORM. The feedback path information is sent only when the working node of the last layer that processes the source data completes the processing, without the need for feeding back the processing information whenever each node completes the processing, thereby reducing network resources occupied by feedback information during the processing, preventing a message blocking problem that may be caused by processing a large amount of feedback information, and being capable of improving the overall performance of the real-time computing system.

What is claimed is:

1. A method for monitoring data processing status comprising:
   receiving processing information fed back by a working node of a last layer, the processing information is fed back when the working node of the last layer completes processing of sub-data, and the sub-data is obtained by processing source data according to preset layers and decomposing the source data by working nodes of the preset layers; and
   updating the processing status of the source data according to the processing information
   wherein the preset layers include a first layer, subsequent layers and last layers, the sub-data is obtained by processing source data according to preset layers and decomposing the source data by working nodes of the preset layers comprises:
   processing source data by a working note of the first layer and decomposing the source data into at least one first sub-date by the working note of the first layer and sending the at least one first sub-data to subsequent layers;
   processing the at least one first sub-data by working nodes of the subsequent layers layer by layer, and decomposing the at least one first sub-data into sub-data by working nodes of the subsequent layers and sending the sub-data to the working node of the last layer;
   adding an identifier of corresponding working node to each processed data, and the identifier comprises the amount of decomposition of the source data or sub-data in a working node of an upper layer and a serial number.

2. The method according to claim 1, wherein the processing information comprises an identifier of the sub-data.

3. The method according to claim 2, wherein updating the processing status of the source data according to the processing information comprises:
   performing calculation to obtain a calculation result according to the amount of decomposition of the source data and the serial number corresponding to the sub-data; and
   updating the processing status of the source data according to the calculation result.

4. The method according to claim 1, wherein after updating the processing status of the source data according to the processing information, the method further comprising:
   determining whether the processing status reaches a completed status according to the processing information; and
   determining that the processing of the source data is completed when the processing status reaches the completed status.

5. The method according to claim 1, further comprising:
   when the processing information, sent by the working node of the last layer when completing the processing of the sub-data, is not received within a preset time, determining that the processing of the source data fails.

6. The method according to claim 4, further comprising:
   in a situation that it is determined that the processing of the source data is completed, notifying the working node generating the source data.

7. The method according to claim 5, further comprising:
   in a situation that it is determined that the processing of the source data fails, notifying the working node generating the source data.

8. A device for monitoring data processing status, comprising:
   a processor; and
   a memory configured to store instructions executable by the processor;
   wherein the processor is configured to:
   receive processing information fed back by a working node of a last layer, wherein the processing information is fed back when the working node of the last layer completes processing of sub-data, and the sub-data is obtained by processing source data according to preset layers and decomposing the source data by working nodes of the preset layers; and
   update the processing status of the source data according to the processing information;
   wherein the preset layers include a first layer, subsequent layers and last layers, the sub-data is obtained by processing source data according to preset layers and decomposing the source data by working nodes of the preset layers comprises:
   processing source data by a working note of the first layer and decomposing the source data into at least one first sub-date by the working note of the first layer and sending the at least one first sub-data to subsequent layers;
   processing the at least one first sub-data by working nodes of the subsequent layers layer by layer, and decomposing the at least one first sub-data into sub-data by working nodes of the subsequent layers and sending the sub-data to the working node of the last layer;
   adding an identifier of corresponding working node to each processed data, and the identifier comprises the amount of decomposition of the source data or sub-data in a working node of an upper layer and a serial number.

9. The device according to claim 8, wherein, the processing information comprises an identifier of the sub-data.

10. The device according to claim 9, wherein, the processor is further configured to:
    perform calculation to obtain a calculation result according to an amount of decompositions of the source data and the serial number corresponding to the sub-data; and
    update the processing status of the source data according to the calculation result.

11. The device according to claim 8, wherein, the processor is further configured to:
    determine whether the processing status reaches a completed status according to the processing information; and
    determine that the processing of the source data is completed when the processing status reaches a completed status.

12. The device according to claim 8, wherein, the processor is further configured to:
    determine that the processing of the source data fails when the processing information, sent by the working node of the last layer when completing the processing of the sub-data, is not received within a preset time.

13. The device according to claim 11, wherein, the processor is further configured to:
    notify the working node generating the source data when it is determined that the processing of the source data is completed.

14. The device according to claim 12, wherein, the processor is further configured to:
- notify the working node generating the source data when it is determined that the processing of the source data fails.

15. A non-transitory computer-readable storage medium having stored therein instructions that, when executed by a processor, cause the processor to implement a method for monitoring data processing status, the method for monitoring data processing status comprising:
- receiving processing information fed back by a working node of a last layer, the processing information is fed back when the working node of the last layer completes processing of sub-data, and the sub-data is obtained by processing source data according to preset layers and decomposing the source data by working nodes of the preset layers; and
- updating the processing status of the source data according to the processing information;
- wherein the preset layers include a first layer, subsequent layers and last layers, the sub-data is obtained by processing source data according to preset layers and decomposing the source data by working nodes of the preset layers comprises:

processing source data by a working note of the first layer and decomposing the source data into at least one first sub-date by the working note of the first layer and sending the at least one first sub-data to subsequent layers;

processing the at least one first sub-data by working nodes of the subsequent layers layer by layer, and decomposing the at least one first sub-data into sub-data by working nodes of the subsequent layers and sending the sub-data to the working node of the last layer;

adding an identifier of corresponding working node to each processed data, and the identifier comprises the amount of decomposition of the source data or sub-data in a working node of an upper layer and a serial number.

\* \* \* \* \*